Patented July 9, 1940

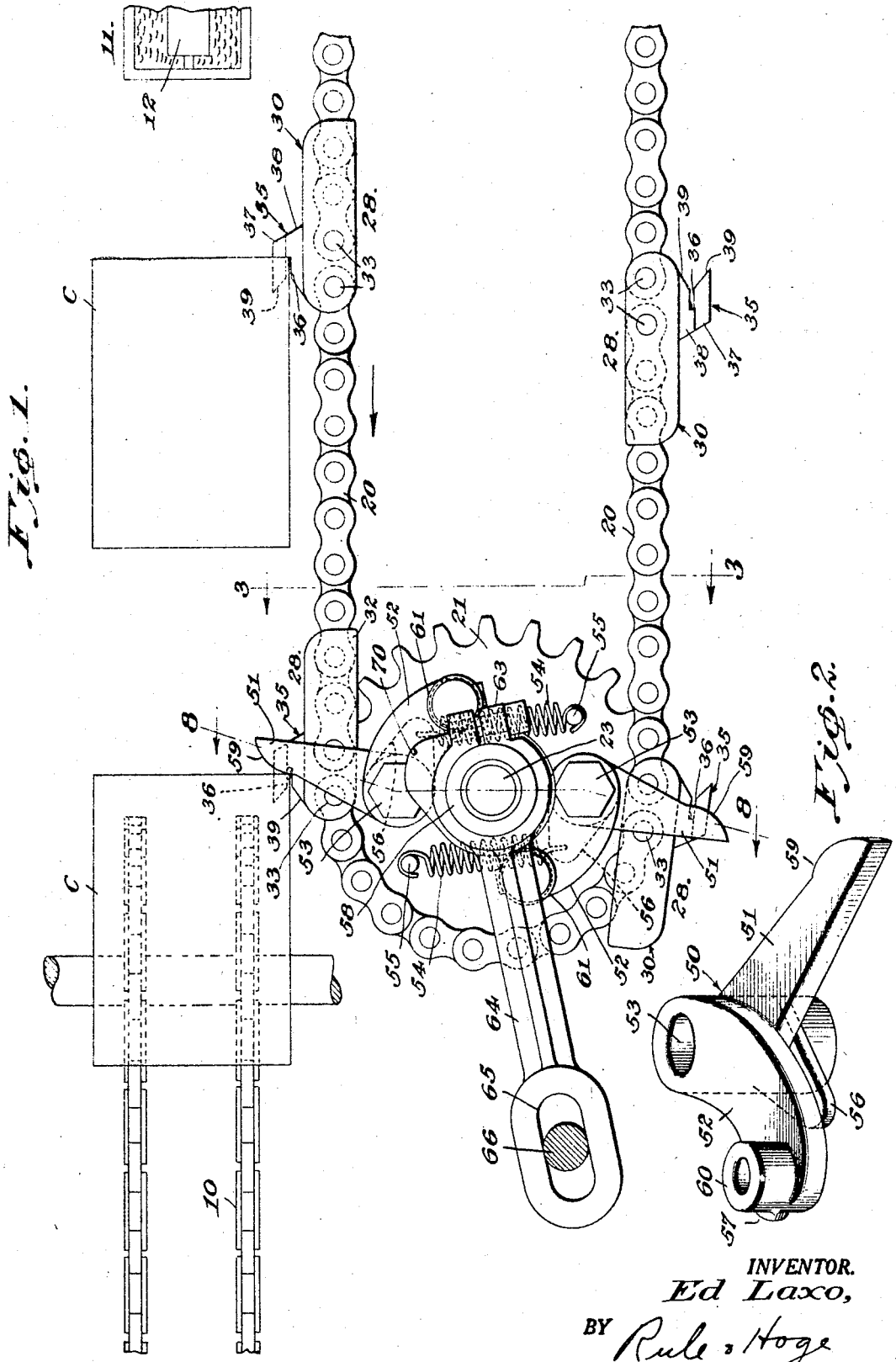

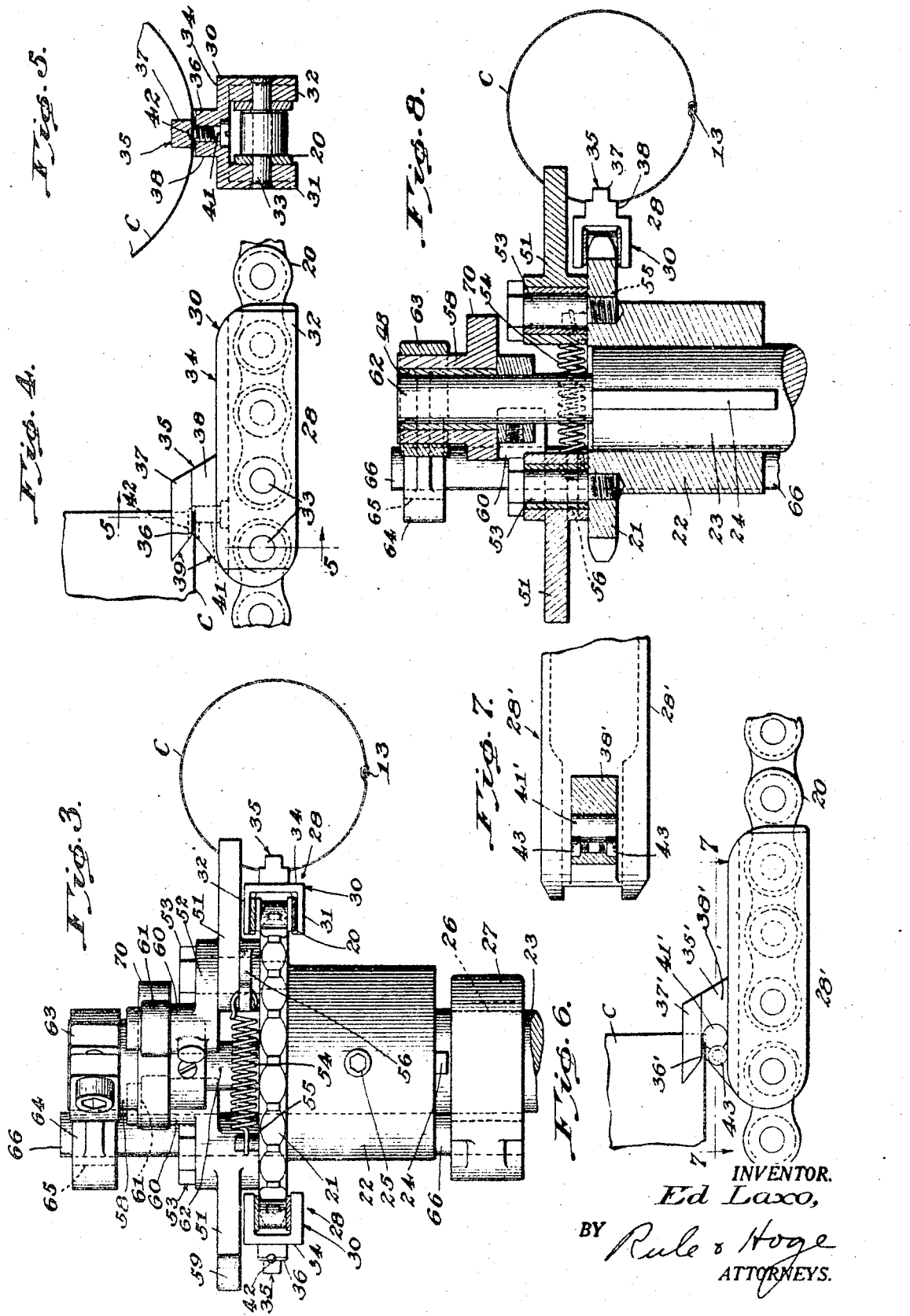

2,207,349

UNITED STATES PATENT OFFICE 2,207,349

CAN BODY TRANSFER CONVEYER

Ed Laxo, Riverside, Ill., assignor to Owens-Illinois Can Company, a corporation of Delaware Application June 28, 1938, Serial No. 216,239

7 Claims. (Cl. 198—179)

The present invention relates to can making machinery and more particularly to a can body transfer conveyer by means of which can bodies are transferred in rapid succession from a can body-making machine to a cooler chain while at the same time they are passed over a solder roll with their longitudinal seams in direct soldering contact therewith.

The principal object of the invention is to provide a transfer conveyer of the type set forth above which will efficiently and rapidly receive the can bodies from the body-making machine, convey the same over the solder roll properly oriented for contact of the longitudinal body seam therewith, while at the same time preventing the bodies from turning due to friction with the roll, and discharge the can bodies onto the cooler chain in axial alignment.

Another object of the invention is to provide a transfer conveyer of the character set forth above which will accommodate can bodies of various size without requiring substantial modification of the apparatus.

Other objects of the invention, not at this time particularly enumerated, will become apparent as the nature of the invention is better understood.

In the accompanying drawings:

Fig. 1 is a fragmentary top plan view showing the discharge end of a conveyer manufactured in accordance with the principles of the present invention in operative relation to a solder roll and a cooler chain;

Fig. 2 is an enlarged perspective view of one element of an ejecting mechanism employed in connection with the invention;

Fig. 3 is a sectional view taken substantially along the line 3—3 of Fig. 1;

Fig. 4 is an enlarged fragmentary top plan view of a portion of the conveyer chain showing an attachment link by means of which the cans are supported during transfer;

Fig. 5 is a sectional view taken substantially along the line 5—5 of Fig. 4;

Fig. 6 is a fragmentary top plan view, similar to Fig. 4, showing a modified form of attachment link;

Fig. 7 is a sectional view taken substantially along the line 7—7 of Fig. 6; and Fig. 8 is a sectional view taken substantially along the line 8—8 of Fig. 1.

Referring now to Fig. 1 of the drawings, a portion of a cooler chain assembly 10 adjacent the receiving end thereof is shown. A solder roll assembly 11 includes a solder roll 12 over which the can bodies C are adapted to be moved with their longitudinal seams 13 (Fig. 8) in operative soldering contact therewith.

The conveyer by means of which the can bodies are received from the body-making machine (not shown) and are drawn or moved over the solder roll 12 and finally deposited on the cooler chain 10, comprises a chain 20 the discharge end of which is supported upon a sprocket wheel 21 (Figs. 1 and 8). The sprocket wheel 21 is integrally formed on a sleeve 22 mounted on a vertical drive shaft 23 and secured thereto by means of a key 24, the sleeve being secured in position by means of a set screw 25 (Fig. 3) extending through the same. The drive shaft 23 is connected in any suitable manner to a driving source (not shown) and is rotatably mounted medially of its ends in a bearing 26 provided in a support 27.

Referring now to Figs. 1 and 4, a plurality of can supporting and conveying units 28 are mounted on the conveyer chain 20 at spaced regions therealong. The units 28 are in the form of attachment links for the conveyer chain 20 and are designed to receive the can bodies C by direct impact therewith at a receiving station located at or near the body-making machine. From the receiving station the bodies C, supported solely by the units 28, are passed over the solder roll 12 with the seams thereof in soldering contact with the same and are discharged onto the cooler chain at a discharging station.

Each unit or link 28 comprises an elongated channel-shaped body portion 30 (Figs. 4 and 5) the horizontal opposite sides 31 and 32 of which straddle a portion of the chain 20. The sides 31 and 32 are attached to the opposed ends of adjacent conveyer links at spaced points by means of pins 33 which, of course, are spaced apart a distance equal to the center-to-center distance between adjacent conveyer pins. The forward pin 33 is located near the forward edge of the body portion 30 while the other pin is consequently located in the medial regions thereof. The sides 31 and 32, together with the interconnecting vertical portion 34 of the channel-shaped body portion 30 enclose a portion of the conveyer chain 20 on three sides thereof and lend stability to the unit 28 as will appear presently. Integrally formed with the vertical connecting portion 34 of the body portion 30 is a can retaining and supporting block 35 having a slot 36 formed in the forward side thereof into which the rear circumferential edges or rims of the can bodies are adapted to extend. The portion 37 of the block 35 on the outside of the slot 36 is narrower than the inner portion 38 thereof on the inside of the slot and both portions 37 and 38 are bevelled as at 39 to provide a tapered guide for guiding the rim of the can bodies C into the slot 36. A set screw 41 (Fig. 4) extending through the inner portion 38 of the block 35 opposes a recess 42 formed in the narrow portion 37 thereof. The set screw 41 is provided with a rounded end which is adapted to displace a restricted area in the can body and prevent the body from turning in the slot when the body is passed over the rotating solder roll 12.

Upon movement of the conveyer chain 20 in the direction indicated by the arrow in Fig. 1, the units 28 are adapted to move into the path of successive can bodies at the receiving station and, by direct impact with the rims thereof, the latter are forced into the slots 36 and become wedged between the rounded end of the set screw 41 and the opposed wall of the slot. Because of the fact that a goodly portion of the channel-shaped body portion 30 of the unit or link 28 surrounds three sides of the chain 20 rearwardly of the pins 33, the link 28 is not tilted out of alignment with the portion of the chain in the immediate vicinity and on either side thereof due to impact with the can body.

In Figs. 6 and 7 a slightly modified form of can body conveying and supporting unit or link 28' is shown. The unit 28' is similar in its design to the unit 28 with the exception of the actual can engaging instrumentalities in the vicinity of the slot 36'. In this form of unit the recess 42 is omitted and the rims of the can bodies C are adapted to be wedged against the inside surface of the outer portion 37' of the block 35' by means of a cylindrical pin 41' disposed transversely in the inner portion 38' and held securely in place by means of locking screws 43.

Referring now to Figs. 1, 3 and 8, the sprocket wheel 21 has associated therewith means for ejecting the can bodies from the units 28 or 28' as the case may be and for depositing the same on the cooler chain 10. Toward this end, a pair of bell crank levers 50 (see also Fig. 2) each including an ejector arm 51 and an actuating arm 52 are fulcrumed as at 53 to diametrically opposed points on the sprocket wheel 21 inwardly of the periphery thereof. The ejector arms 51 are adapted, upon swinging movement of the levers 50 about their fulcrums, to engage the rims of the can bodies C approaching the cooler chain 10 and forcibly eject the same from the slots 36 or 36' in the units 28 or 28' as the case may be when the latter are in the vicinity of the cooler chain 10 immediately prior to their rounding the end of the transfer conveyer on the chain 20. Accordingly, the ejector arms 51 are normally maintained in an extended position by means of coil springs 54 which are secured to pins 55 formed on the sprocket wheel 21 and to attachment lugs 56 formed on the levers 50. The outer end of each ejector arm 51 is formed with a rounded contact surface 59 designed for camming engagement with the rims of the can bodies C during ejection of the latter from the slots 36 or 36'.

Each actuating arm 52 has formed thereon near the free end thereof a boss 60 designed for the support of a cam roller 61. A stationary angularly adjustable sleeve 58, fitted with a bushing 48, is mounted on a reduced extension 62 provided on the shaft 23 and is adjustably clamped in a split sleeve 63 integrally formed at one end of a link 64. The other end of the link 64 is slotted as at 65 and a rod 66 projects upwardly from the support 27 and extends through the slot 65. Thus the sleeve 58 is prevented from turning on the extension 62 while the reduced end 62 of the shaft 23 is freely rotatable in the bushing 48.

A cam 70 formed on the sleeve 58 is positioned in the path of movement of the cam rollers 61 and is so oriented with respect to the conveyer and cooler chain that as the can bodies C successively approach the cooler chain the cam rollers 61 successively travel outwardly on the stationary cam 70 thus tilting the levers 50 about their fulcrums on the sprocket wheel 21 and thereby actuating the ejector arms 51. During such actuation of the ejector arms 51, the linear rate of speed of the outer regions thereof is greater than the linear rate of speed of the can supporting units 28 and thus when the contact surfaces 59 come into engagement with the can bodies C, the rims of the same are forcibly ejected from the slots 36 and the bodies fall by gravity onto the cooler chain in axial alignment.

The improved transfer conveyer will accommodate can bodies of varying lengths without modification but in order to accommodate extremely long can bodies it is necesary to increase the distance between adjacent attachment links 28 by substituting additional links in the conveyer chain 20. In such cases it is also necessary to substitute sprocket wheels 21 of greater diameter and having a greater number of teeth thereon together with longer cams 70. The rod and slot connection 64, 65 will permit such substitutions to be made without further modification of the apparatus while the split sleeve 63 will permit the angular position of the cam 70 with respect to the sprocket wheel to be altered in order to insure contact of the ejector arms 51 with the rims of the can bodies C at the proper time.

Modifications may be resorted to within the spirit and scope of the appended claims.

I claim:

1. A can body supporting unit for can body transfer conveyers comprising a block adapted to be mounted on the conveyer and to move therewith and designed for impact with the forward rim portion of a can body issuing from a body-making machine, there being a slot in said block into which the rim portion of the body is adapted to extend upon impact with the block, there being a recess on one side of said slot, and a set screw extending through a portion of the block and projecting into said slot and recess whereby upon impact between the rim and block the former is wedged between the set screw and the edges of the recess.

2. A can body transfer conveyer comprising a conveyer chain, a sprocket wheel therefor, a block mounted on the conveyer chain and movable therewith, said block being designed for impact with the rim portion of a can body issuing from a body-making machine, means on said block for engaging the rim portion of the can body on opposite sides of the metal from which the body is formed to frictionally retain said body suspended from the block, movable means mounted on the sprocket wheel for engaging said rim portion to forcibly eject the same from said retaining means, and stationary cam means for actuating said ejecting means.

3. In a can body transfer conveyer, a conveyer chain comprised of individual links hinged together, a sprocket wheel for said chain, means for driving said sprocket wheel, a can body attachment link for said chain, means on said attachment link for frictionally engaging the rim portion of a can body to support the same, movable means mounted on the sprocket wheel for engaging said rim portion to forcibly eject the same from said supporting means, and stationary cam means for actuating said ejecting means.

4. In a can body transfer conveyer, a conveyer chain, a sprocket wheel therefor, means for driving said sprocket wheel, means carried by said chain at spaced points therearound for frictionally supporting a plurality of can bodies, movable means mounted on the sprocket wheel for engaging successive bodies on the conveyer to forcibly eject the same therefrom, and stationary cam means for actuating said ejecting means.

5. In a can body transfer conveyer, a conveyer chain, a sprocket wheel therefor, means for driving said sprocket wheel, means carried by said chain at spaced points therearound for frictionally supporting a plurality of can bodies, an ejector arm pivoted to said sprocket wheel and adapted upon swinging movement relative to the wheel to engage successive can bodies on the conveyer to forcibly remove the same from their respective supporting means, a cam roller connected to said arm, and a stationary cam positioned in the path of movement of said cam roller.

6. In a can body transfer conveyer, a conveyer chain, a sprocket wheel therefor, means for driving said sprocket wheel, means carried by said chain at spaced points therearound for frictionally supporting a plurality of can bodies, a bellcrank lever pivoted to said sprocket wheel and including an ejector arm and an actuating arm, said ejector arm being adapted to engage successive can bodies on the conveyer to forcibly eject the same therefrom, and a stationary cam positioned in the path of movement of said ejector arm.

7. In a can body transfer conveyer, a conveyer chain, a sprocket wheel therefor, means for driving said sprocket wheel, means carried by said chain at spaced points therearound for frictionally supporting a plurality of can bodies, a bellcrank lever pivoted to said sprocket wheel and including an ejector arm and an actuating arm, said ejector arm being adapted to engage successive can bodies on the conveyer to forcibly eject the same therefrom, a stationary cam positioned in the path of movement of said ejector arm, and means adjustably clamping said cam in a fixed position.

ED LAXO.